United States Patent
Park

(10) Patent No.: US 9,457,343 B2
(45) Date of Patent: Oct. 4, 2016

(54) REGENERATION OR REMANUFACTURING CATALYST FOR HYDROGENATION PROCESSING HEAVY OIL, AND METHOD FOR MANUFACTURING SAME

(75) Inventor: Hea Kyung Park, Seoul (KR)

(73) Assignee: Hanseo University Academic Cooperation Foundation, Chungcheongnam-do (KR)

( * ) Notice: Subject to any disclaimer, the term of this patent is extended or adjusted under 35 U.S.C. 154(b) by 340 days.

(21) Appl. No.: 14/115,389

(22) PCT Filed: May 2, 2012

(86) PCT No.: PCT/KR2012/003443
§ 371 (c)(1),
(2), (4) Date: Nov. 4, 2013

(87) PCT Pub. No.: WO2012/150816
PCT Pub. Date: Nov. 8, 2012

(65) Prior Publication Data
US 2014/0076781 A1 Mar. 20, 2014

(30) Foreign Application Priority Data

| May 2, 2011 | (KR) | 10-2011-0041274 |
| May 2, 2012 | (KR) | 10-2012-0046552 |
| May 2, 2012 | (KR) | 10-2012-0046553 |
| May 2, 2012 | (KR) | 10-2012-0046554 |

(51) Int. Cl.
*B01J 21/02* (2006.01)
*B01J 21/04* (2006.01)
(Continued)

(52) U.S. Cl.
CPC ............ *B01J 23/94* (2013.01); *B01J 23/882* (2013.01); *B01J 23/883* (2013.01); *B01J 23/8877* (2013.01); *B01J 38/02* (2013.01); *B01J 38/06* (2013.01); *B01J 38/485* (2013.01); *B01J 38/50* (2013.01); *B01J 38/56* (2013.01);
(Continued)

(58) Field of Classification Search
CPC .......... B01J 21/02; B01J 21/04; B01J 21/08; B01J 21/12; B01J 21/20; B01J 23/28; B01J 23/30; B01J 23/75; B01J 23/755; B01J 23/88; B01J 23/882; B01J 23/883; B01J 23/888; B01J 23/92; B01J 23/94; B01J 35/1019; B01J 35/1028
USPC .................................. 502/305, 315
See application file for complete search history.

(56) References Cited

U.S. PATENT DOCUMENTS 3,020,239 A   2/1962 Flinn et al.
3,068,303 A * 12/1962 Pattison ................. B01J 23/883
                                                        502/314
(Continued)

FOREIGN PATENT DOCUMENTS

JP   2000-144151 A   5/2000
KR   10-2001-0022250 A   3/2001
(Continued)

*Primary Examiner* — Patricia L Hailey
(74) *Attorney, Agent, or Firm* — Hammer & Associates, P.C.

(57) ABSTRACT

Provided are a regenerated or remanufactured catalyst for hydrogenating heavy oil or residual oil obtained by effectively removing a sulfur component, a carbonaceous component and a vanadium component, which are present in a spent catalyst for hydrogenating the heavy oil or residual oil and thus degrade an activity thereof, a method of manufacturing the same, and a method of hydrogenating heavy oil or residual oil using the same.

7 Claims, 4 Drawing Sheets

(51) Int. Cl.

| | | |
|---|---|---|
| *B01J 21/08* | (2006.01) | |
| *B01J 21/12* | (2006.01) | |
| *B01J 21/20* | (2006.01) | |
| *B01J 23/28* | (2006.01) | |
| *B01J 23/30* | (2006.01) | |
| *B01J 23/75* | (2006.01) | |
| *B01J 23/755* | (2006.01) | |
| *B01J 23/88* | (2006.01) | |
| *B01J 23/94* | (2006.01) | |
| *C10G 45/08* | (2006.01) | |
| *B01J 23/887* | (2006.01) | |
| *C10G 45/34* | (2006.01) | |
| *B01J 38/02* | (2006.01) | |
| *B01J 38/06* | (2006.01) | |
| *B01J 38/48* | (2006.01) | |
| *B01J 38/50* | (2006.01) | |
| *B01J 38/56* | (2006.01) | |
| *B01J 38/62* | (2006.01) | |
| *B01J 23/882* | (2006.01) | |
| *B01J 23/883* | (2006.01) | |

(52) U.S. Cl.
CPC .............. *B01J 38/62* (2013.01); *C10G 45/08* (2013.01); *C10G 45/34* (2013.01)

(56) References Cited

U.S. PATENT DOCUMENTS

| | | | | |
|---|---|---|---|---|
| 4,485,183 | A * | 11/1984 | Miller | B01J 23/94 |
| | | | | 208/216 R |
| 4,743,574 | A * | 5/1988 | Morales | B01J 23/882 |
| | | | | 208/114 |
| 4,975,399 | A * | 12/1990 | Gardner | B01J 23/85 |
| | | | | 208/216 R |
| 5,641,395 | A * | 6/1997 | Hettinger, Jr. | C10G 11/05 |
| | | | | 208/113 |
| 6,398,950 | B1 * | 6/2002 | Iwamoto | B01J 23/88 |
| | | | | 208/143 |
| 6,406,615 | B1 * | 6/2002 | Iwamoto | C10G 45/04 |
| | | | | 208/213 |
| 2002/0111268 | A1 * | 8/2002 | Lee | B01D 53/8662 |
| | | | | 502/309 |
| 2003/0130118 | A1 * | 7/2003 | Koyama | B01J 23/85 |
| | | | | 502/337 |
| 2004/0053771 | A1 * | 3/2004 | Choi | B01D 53/8628 |
| | | | | 502/27 |

FOREIGN PATENT DOCUMENTS

| | | |
|---|---|---|
| KR | 10-2006-0080198 A | 7/2006 |
| KR | 10-2007-0006584 A | 1/2007 |

* cited by examiner

REGENERATION OR REMANUFACTURING CATALYST FOR HYDROGENATION PROCESSING HEAVY OIL, AND METHOD FOR MANUFACTURING SAME

TECHNICAL FIELD

This invention relates to a regenerated or remanufactured catalyst for hydrogenating heavy oil and a method of manufacturing the same. More particularly, this invention relates to a regeneration or remanufacture of a spent catalyst to recover a degraded catalytic activity of the spent catalyst from 90 up to 100% on the basis of that of fresh catalyst. Here, the spent catalyst is a used heavy oil hydrogenation catalyst, for example, a used residue hydrodesulfurization (RHDS: residue hydrodesulfurization) or denitrification catalyst, from which a valuable metal is recovered, or which is disposed of.

BACKGROUND ART

There are various processes for refining a variety of residues by hydrogenation in refinery. For example, the processes include desulfurization or denitrification of naphtha, kerosene, or diesel oil; desulfurization or denitrification of heavy diesel oil; desulfurization or denitrification of residual or heavy oil.

Among these processes, a catalyst used in hydrogenation for naphtha, kerosene or diesel oil, which has a relatively low boiling point and contains almost no metal impurities such as vanadium deteriorates less according to the use of the catalyst. In addition, the deterioration of such a catalyst is caused by accumulation of a very small amount of carbonaceous materials, and this catalyst can be reused by only combustion. In addition, in the aspect of the removal of the carbonaceous material, a reusable catalyst can be easily obtained without precise combustion control because a small amount of carbonaceous materials is included in the catalyst. In addition, a catalyst that deteriorates less even when it is used can be reused without any treatment. Such a catalyst is used again in treatment of naphtha, kerosene, diesel oil, etc. without special care.

In addition, a hydrogenation catalyst for heavy diesel oil or vacuum diesel oil is recycled by regeneration, and methods of regenerating and using the same are established. For example, it is known that a hydrocracking catalyst used in a heavy diesel oil hydrocracking process, or a hydrodenitrification catalyst for pretreatment is regenerated by hydrogen activation or oxygen activation. Since above-mentioned oils have almost no metal impurities, metal foulants such as vanadium are also less deposited in the catalyst. In addition, carbonaceous materials deposited on such a catalyst are also easily combustible, and thus a surface of the catalyst was not heated enough even when regenerated by combustion. Moreover, a micropore structure of a catalyst supporter or an impregnated state of an active metal was less changed, and the catalyst had been used in treatment of split oil such as heavy diesel oil or vacuum diesel oil (refer to Studies in Surface and Catalysis vol. 88 P199 (1994)).

However, in hydrogenation of heavy oil or residual oil including residues, which has a higher boiling point or is not easily distilled, the crude oil includes a large content of metal impurities, and a large content of easily carbonized components such as an asphalt component. Accordingly, the metal impurities or carbonaceous materials was simultaneously deposited at a large content on the completely used catalyst, and thus these materials could not be simply removed by combustion (refer to Catal. Today vol. 17 No. 4 P539 (1993), Catal. Rev. Sci. Eng. 33 (3 & 4) P281 (1991)). For this reason, the used catalyst was not recycled and was disposed of.

An amount of heavy oil hydrogenation catalyst, particularly, a heavy oil residue hydrodesulfurization catalyst, consumed worldwide is rapidly increasing due to the building and upgrading of highly developed facilities (heavy oil cracking process), which is now known as a second oil field among the developed countries as well as in Korea, and the four refineries in Korea are now showing 23,000 tons per year. These catalysts are dependent on imports, import prices are currently approximately $20/kg, and approximately 500 billion KRW a year or more relies on such imports.

The heavy oil residue hydrodesulfurization catalyst has a life span of 3 to 4 months as a guard catalyst (from which metals are mostly removed in a heavy oil desulfurization unit), and approximately 1 year as a main catalyst. After use, the catalyst is crushed to recover only valuable metals, or buried as a waste material if it is less economical.

In general, as a representative method of recovering valuable metals from a spent catalyst for petroleum desulfurization, a high temperature soda method, a solvent extraction method, an ion exchange method, or a precipitation method is used. Depending on a metal to be recovered, valuable metals are recovered in an oxide type through water leaching after low temperature roasting or high temperature roasting, selective precipitation, and calcination. On the other hand, in Korea Patent Publication No. 2001-0022250, a method of regenerating heavy oil hydrogenation including cleaning a spent catalyst using a solvent, and removing a carbonaceous material by combustion under an oxygen atmosphere is disclosed. However, even according to this method, vanadium present in the spent catalyst could not be selectively removed.

DISCLOSURE

Technical Problem

This invention is directed to providing a regenerated or remanufactured catalyst for hydrogenating heavy oil or residual oil from which metal components including a vanadium oxide, a sulfur component, a carbonaceous material component, which are present in a spent catalyst for hydrogenating the heavy oil or residual oil and degrade an activity of the catalyst, are effectively removed.

This invention is also directed to providing a regeneration method of a spent catalyst for hydrogenating the heavy oil or residual oil.

This invention is also directed to providing a remanufacturing method of a spent catalyst for hydrogenating the heavy oil or residual oil.

This invention is also directed to providing a method of selectively removing a vanadium component from a spent catalyst for hydrogenating the heavy oil or residual oil.

This invention is also directed to providing a method of hydrogenating heavy oil or residual oil using a regenerated or remanufactured catalyst for hydrogenating the heavy oil or residual oil.

This invention is also directed to providing a method of hydrogenating heavy oil or residual oil simultaneously using a regenerated or remanufactured catalyst for hydrogenating the heavy oil or residual oil, and a fresh catalyst.

Technical Solution

One aspect of this invention provides a regenerated or remanufactured catalyst for hydrogenating heavy oil or residual oil, which includes an active component and a catalyst supporter, and has a content of a vanadium oxide measured by XRF of 1 wt % or less.

Another aspect of this invention provides a regeneration method of a spent catalyst for hydrogenating heavy oil or residual oil, which includes a cleaning operation to remove heavy oil or residual oil from a spent catalyst by using a solvent, a thermal treatment operation to remove carbon and sulfur dioxide by thermally treating the cleaned catalyst, and an acid treatment operation to remove metal impurities by the contact of the thermally treated catalyst with an oxalic acid solution.

Still another aspect of this invention provides a remanufacturing method of a spent catalyst for hydrogenating heavy oil or residual oil which includes a cleaning operation to remove heavy oil or residual oil from a spent catalyst by using a solvent, a thermal treatment operation to remove carbon and sulfur dioxide by thermally treating the cleaned catalyst, and an acid treatment operation to remove metal impurities by contact of the thermally treated catalyst with an acid solution, and an operation of impregnating an additional active component to the acid-treated catalyst.

Yet another aspect of this invention provides a method of selectively removing a vanadium component, which includes contacting a spent catalyst with an oxalic acid solution.

Yet another aspect of this invention provides a method of hydrogenating heavy oil or residual oil, which includes contacting a regenerated or remanufactured catalyst including an active component and a catalyst supporter and having a content of a vanadium oxide measured by XRF of 1 wt % or less, with the heavy oil or residual oil.

Yet another aspect of this invention provides a method of hydrogenating heavy oil or residual oil, which includes contacting a regenerated or remanufactured catalyst including an active component and a catalyst supporter and having a content of a vanadium oxide measured by XRF of 1 wt % or less, and a fresh catalyst, with the heavy oil or residual oil.

Advantageous Effects

According to this invention, a regenerated or remanufactured catalyst can be reused by simply removing impurities to recover catalyst activity to 95% or more on the basis of that of a fresh catalyst, and thus can have excellent economic feasibility. In addition, the reuse of a spent catalyst to be disposed of or buried can lead to reduction of environmental burdens.

MODES OF INVENTION

Figure 1:
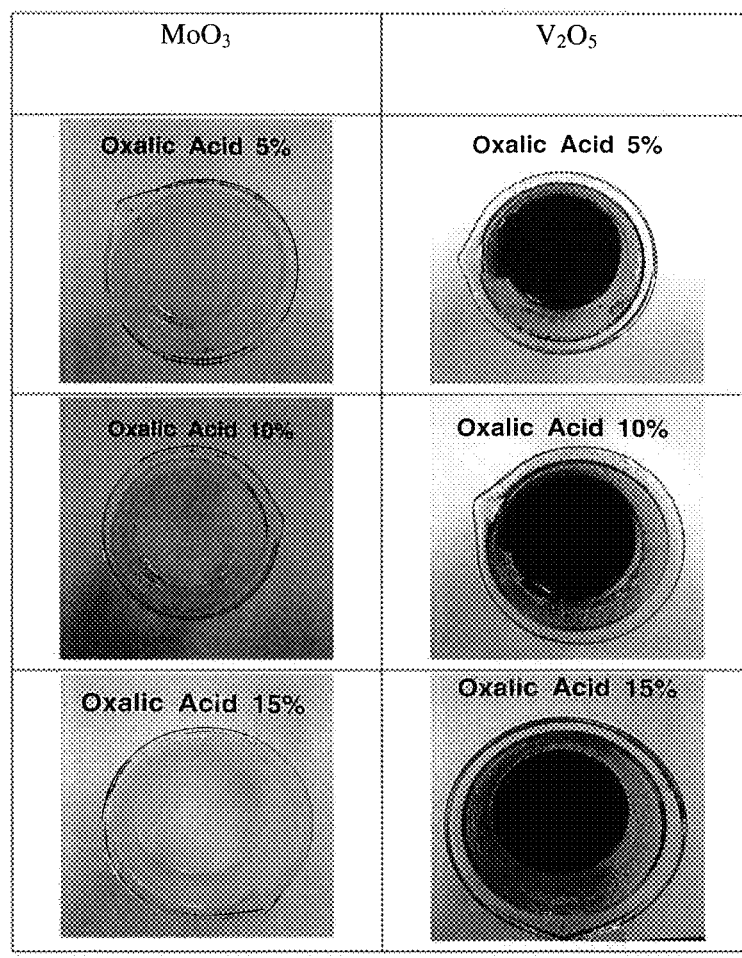
FIG. 1 shows a result of a leaching reaction in an oxalic acid solution between a main active component, molybdenum, and a main activity degrading component thereof, vanadium.

The terms used herein are as follow.

The term "heavy oil or residual oil" includes a distillation residue component such as an atmospheric residue or vacuum residue, but does not include only split oil such as kerosene, diesel oil, or vacuum diesel oil. The heavy oil usually includes a sulfur content in an amount of 1 wt % or more, a nitrogen component in an amount of 200 ppm by weight or more, a coke component in an amount of 5 wt % or more, vanadium in an amount of 5 ppm or more, and an asphalt component in an amount of 0.5 wt % or more. For example, crude oil, asphalt oil, thermal cracking oil, tar sand oil, or mixed oil including the same as well as atmospheric residue or vacuum residue may be used.

The fresh catalyst may be manufactured as a catalyst for hydrogenation such as desulfurization, demetallization, denitrification and cracking of the heavy oil, or may perform multi-hydrogenation function such as desulfurization, demetallization, denitrification, and cracking. The fresh catalyst may be a commercially available hydrodesulfurization catalyst, hydrodemetallization catalyst, or a specially manufactured catalyst having a hydrogenation function. As such a catalyst, one that has never been used in hydrogenation, or one that has been used once but its use was interrupted after a short time due to the problems of a device is included. In other words, a catalyst still having a sufficient hydrogenation activity without special activation treatment, despite having been temporarily used, is also included.

The term "spent catalyst" refers to a catalyst once used in hydrogenation of heavy oil or residual oil, so that a sufficient hydrogenation activity cannot be obtained from the catalyst without a special treatment. The hydrogenation is generally desulfurization, but may be demetallization, denitrification, dearomatization, or cracking. In addition, hydrogenation is generally treatment of heavy oil, but regeneration of a catalyst can also be used in hydrogenation of split oil such as heavy diesel oil. The regenerated catalyst is preferably used in hydrogenation of heavy oil. Generally, in the heavy oil residue hydrodesulfurization catalyst, 10% or more of vanadium from crude oil is precipitated in the catalyst in desulfurization, and 5% or more of carbon which is an inflammable material and 10% or more of sulfur are precipitated in the catalyst. The sulfur and carbon component precipitated in the catalyst can be removed by a suitable material, but the vanadium is not easily removed. Accordingly, it is the more important to selectively and completely remove only the precipitated vanadium, without the metal active component of the catalyst.

Table 1 shows a representative composition of a typical heavy oil spent catalyst.

TABLE 1

| | Kinds | | | | | | | | |
|---|---|---|---|---|---|---|---|---|---|
| | Mo | V | Ni | Co | Fe | P | S | Al | Water + oil |
| Spent catalyst (wt %) | 3~6 | 2~12 | 2~3 | 0.5~1 | 0.5~1 | 0.1 or less | 8~12 | bal. | 5~12 |

The regenerated catalyst is manufactured by removing impurities to activate the spent catalyst through regeneration of the spent catalyst according to this invention.

The remanufactured catalyst is manufactured by further carrying an active component into the regenerated catalyst.

This invention relates to a regenerated or remanufactured catalyst for hydrogenating heavy oil or residual oil, which includes an active component and a catalyst supporter, and has a content of a vanadium oxide measured by XRF of 1 wt % or less.

The active component of the regenerated or remanufactured catalyst according to this invention is known in the art, and includes at least one selected from the group consisting of molybdenum, tungsten, cobalt, nickel and an oxide thereof, but this invention is not limited thereto.

More specifically, the active component may include molybdenum or tungsten as a main catalyst, and include cobalt or nickel as a co-catalyst.

The catalyst supporter may be alumina, or a catalyst supporter carrying phosphorus, boron, silicon or an oxide thereof in alumina, but this invention is not limited thereto.

For example, depending on the combination, the catalyst supporter includes CoMo, NiMo, CoW, or NiW/$\gamma$-$Al_2O_3$.

The regenerated or remanufactured catalyst according to this invention has a content of a vanadium oxide measured by XRF of 1 wt % or less, and a content of sulfur trioxide of 1 wt % or less. Specifically, this invention relates to a catalyst carrying an active component such as molybdenum, tungsten, cobalt, or nickel oxide as an active component, from which a similar metal component or a poisoning material of the active component, that is, a vanadium oxide, is selectively removed, and thus its content is maintained at 1 wt % or less. However, the main catalyst components such as molybdenum or tungsten contain 70% or more, preferably, 80% or more, and more preferably 90% or more with respect to the fresh catalyst. The contents of the vanadium oxide and sulfur trioxide measured by XRF may be, for example, 0.9 wt % or less, 0.8 wt % or less, 0.6 wt % or less, 0.5 wt % or less, 0.4 wt % or less, or 0.3 wt % or less. When each of the contents of the vanadium oxide and sulfur trioxide is more than 1 wt %, the catalyst is not appropriate to be used as the regenerated or remanufactured catalyst due to a decreased catalytic activity.

In addition, the regenerated or remanufactured catalyst according to this invention has a BET specific surface area of 200 $m^2$/g or more, for example, 210 or 220 $m^2$/g or more, or 230 to 300 $m^2$/g. The spent catalyst has a BET specific surface area of 100 $m^2$/g or less, for example, 80 $m^2$/g or less, because impurities are precipitated in a pore of the catalyst. However, the regenerated or remanufactured catalyst according to this invention may have a specific surface area, which is 80% or more, preferably 85% or more, and more preferably 90% or more on the basis of that of the fresh catalyst, and thus can exhibit a similar activity to the fresh catalyst.

In addition, the regenerated or remanufactured catalyst according to this invention has a value of vanadium elements obtained by ICP elemental analysis of 50 ppm or less, for example, 40 ppm or less, 30 ppm or less, or 5 to 30 ppm. The spent catalyst has a value of vanadium elements, which are catalyst poisoning components, of 150 ppm or more, for example, 200 ppm or more, and a value of sulfur components of 800 ppm, for example, 1000 ppm or more through the ICP elemental analysis. However, since the regenerated or remanufactured catalyst according to this invention has a value of vanadium elements of 50 ppm or less, and a value of sulfur elements of 100 ppm, for example, 80 ppm or less, it may have a small content of a catalyst poisoning material and exhibit excellent activity.

Exact values of the above-described vanadium or sulfur-based components in the regenerated or remanufactured catalyst may be changed depending on an amount of the vanadium or sulfur-based components remaining in the spent catalyst, which is changed depending on an amount of vanadium or sulfur-based components in heavy oil or residual oil treated by the spent catalyst.

The content of vanadium oxide measured by XRF of the regenerated or remanufactured catalyst of this invention is 15% or less, for example, 10% or less or 8% or less on the basis of that of the spent catalyst, and the content of sulfur trioxide measured by XRF of the regenerated or remanufactured catalyst of this invention is 10% or less, for example, 5% or less or 2% or less on the basis of that of the spent catalyst. In contrast, the regenerated or remanufactured catalyst of this invention has an active component, for example, a metal oxide such as nickel oxide, molybdenum oxide, or cobalt oxide, in a ratio of 80% or more, for example, 90% or more, or 95% or more on the basis of that of the fresh catalyst, which is measured by XRF.

Accordingly, the regenerated or remanufactured catalyst of this invention may have an amount of the active component thereof similar to that of the fresh catalyst, or a considerably lower amount of a poisoning material, such as a vanadium-based compound, than that of the spent catalyst, and thus can exhibit excellent activity.

The regenerated or remanufactured catalyst according to this invention has a compressive strength, which is 95% or more on the basis of that of the fresh catalyst. The regenerated or remanufactured catalyst according to this invention still has an excellent mechanical strength after thermal and acid treatment processes, and thus the catalyst is not damaged in delivery and re-supply thereof.

The hydrogenation includes hydrodesulfurization or hydrodenitrification, but this invention is not limited thereto.

This invention also relates to a method of manufacturing a regenerated catalyst for hydrogenating heavy oil or residual oil, which includes: a cleaning operation to remove heavy oil or residual oil from a spent catalyst by the contact of a solvent with the waste solvent for hydrogenating the heavy oil or residual oil; a thermal treatment operation to remove carbon and sulfur dioxide by thermally treating the cleaned catalyst; and an acid treatment operation to remove metal impurities by the contact of the thermally treated catalyst with an oxalic acid solution.

The solvent is not particularly limited, as long as it can clean heavy oil. The solvent may be a hydrocarbon having 6 to 10 carbon atoms such as hexane or heptane.

The thermal treatment operation progresses in an oxygen atmosphere, for example, under an atmosphere of air, and may be performed at a concentration of oxygen of 5 to 50 wt %, but this invention is not particularly limited thereto. The preferable oxygen concentration may be regulated depending on the type of spent catalyst. In addition, the thermal treatment operation may be performed at a vapor concentration of 0 to 70%, preferably 5 to 60%, and more preferably, 10 to 50%.

The solution used in the acid treatment operation is an oxalic acid solution. A concentration of the oxalic acid may be changed depending on the type of spent catalyst, and may be, for example, 5 to 50 wt %. The oxalic acid selectively dissolves the poisoning component of the catalyst, vanadium, and does not dissolve an active component such as molybdenum, nickel or cobalt. A carboxylic acid, which is similar to but different from oxalic acid, does not selectively dissolve the vanadium.

The acid treatment operation may be performed at 25 to 60° C., and under an ultrasonic atmosphere as needed.

This invention also provides a method of manufacturing a remanufactured catalyst for hydrogenating heavy oil or residual oil, which includes: a cleaning operation to remove heavy oil or residual oil from a spent catalyst by the contact of a solvent with the spent catalyst for hydrogenating the heavy oil or residual oil; a thermal treatment operation to remove carbon and sulfur dioxide by thermally treating the cleaned catalyst; an acid treatment operation to remove metal impurities by the contact of the thermally treated catalyst with an oxalic acid solution; and an operation of carrying an additional active component to the acid-treated catalyst.

Since the cleaning operation, thermal treatment operation and acid treatment operation are the same as the above-described method of manufacturing a regenerated catalyst, the operation of carrying an active component will be mainly described below.

As described above, the active ingredient includes, for example, molybdenum, tungsten, cobalt, nickel and oxides thereof, and in the carrying method, wet impregnation may be performed using a known active component precursor, and drying and sintering operations may be further performed as needed.

This invention also relates to a method of selectively removing a vanadium element, which includes contacting a spent catalyst including a vanadium element as an impurity with an acid solution containing oxalic acid.

The vanadium element includes a vanadium oxide such as vanadium pentoxide. A concentration of the oxalic acid may be 5 to 50 wt %, but this invention is not limited thereto.

The operation of contacting an acidic solution with a spent catalyst may be performed at a slightly high temperature, for example, 25 to 60° C., and under an ultrasound atmosphere as needed.

This invention also relates to a method of hydrogenating heavy oil or residual oil, which includes contacting a regenerated or remanufactured catalyst containing an active component and a catalyst supporter, a content of a vanadium oxide measured by XRF being 1 wt % or less, with heavy oil or residual oil.

The regenerated or remanufactured catalyst is the same as described above, and thus the description thereof will be omitted. The hydrogenation includes hydrodesulfurization or hydrodenitrification, but this invention is not limited thereto.

In the method of hydrogenating heavy oil or residual oil by the contact of a layer containing a hydrogenation catalyst with heavy oil or residual oil, the hydrogenation catalyst includes a regenerated or remanufactured catalyst containing an active component and a catalyst supporter and having a content of a vanadium oxide measured by XRF of 1 wt % or less, and a fresh catalyst.

The regenerated or remanufactured catalyst is the same as described above, and thus the description thereof will be omitted. In the layer containing the hydrogenation catalyst, the regenerated or remanufactured catalyst may be placed at an inlet region and the fresh catalyst may be placed at an outlet region, such that the heavy oil or residual oil is first in contact with the regenerated or remanufactured catalyst. In another embodiment, in the layer containing a hydrogenation catalyst, the regenerated or remanufactured catalyst and the fresh catalyst may be alternately placed, and the alternate layers may include at least two layers.

The layer containing the hydrogenation catalyst may contain the regenerated or remanufactured catalyst in an amount of 5 to 80 volume %.

Hereinafter, this invention will be explained with reference to detailed Examples. However, it should be clearly understood by one of ordinary skill in the art that the following Examples are merely provided to explain this invention in further detail, and do not limit the scope of this invention.

EXAMPLE 1

Experiment of Acid Treatment of Spent Catalyst Using Oxalic Acid Solution

To examine a leaching reaction between a main active component of the spent catalyst, such as molybdenum, and a main active-degrading component thereof, such as vanadium, and the oxalic acid solution, oxalic acid was dissolved in distilled water in a beaker to prepare an oxalic acid solution with a concentration of 5 to 15%, to which 3 g each of $MoO_3$ and $V_2O_5$ was added, and cleaned in an ultrasonic constant temperature container at 45° C. at an ultrasonic intensity of 40 kHz for 15 minutes. The result is shown in FIG. 1. As shown in FIG. 1, the solution containing $MoO_3$ in the beaker was turbid because $MoO_3$ was not completely dissolved, and thus precipitation of white powder on the bottom of the beaker was observed. The solution containing $V_2O_5$ in the beaker was dissolved in oxalic acid with green bubbles, and eventually turned dark blue. As the concentration of the oxalic acid was increased, a time taken for the solution to turn blue decreased.

COMPARATIVE EXAMPLE 1

Experiment of Acid Treatment of Spent Catalyst Using Other Dicarboxylic Acid

Figure 2:
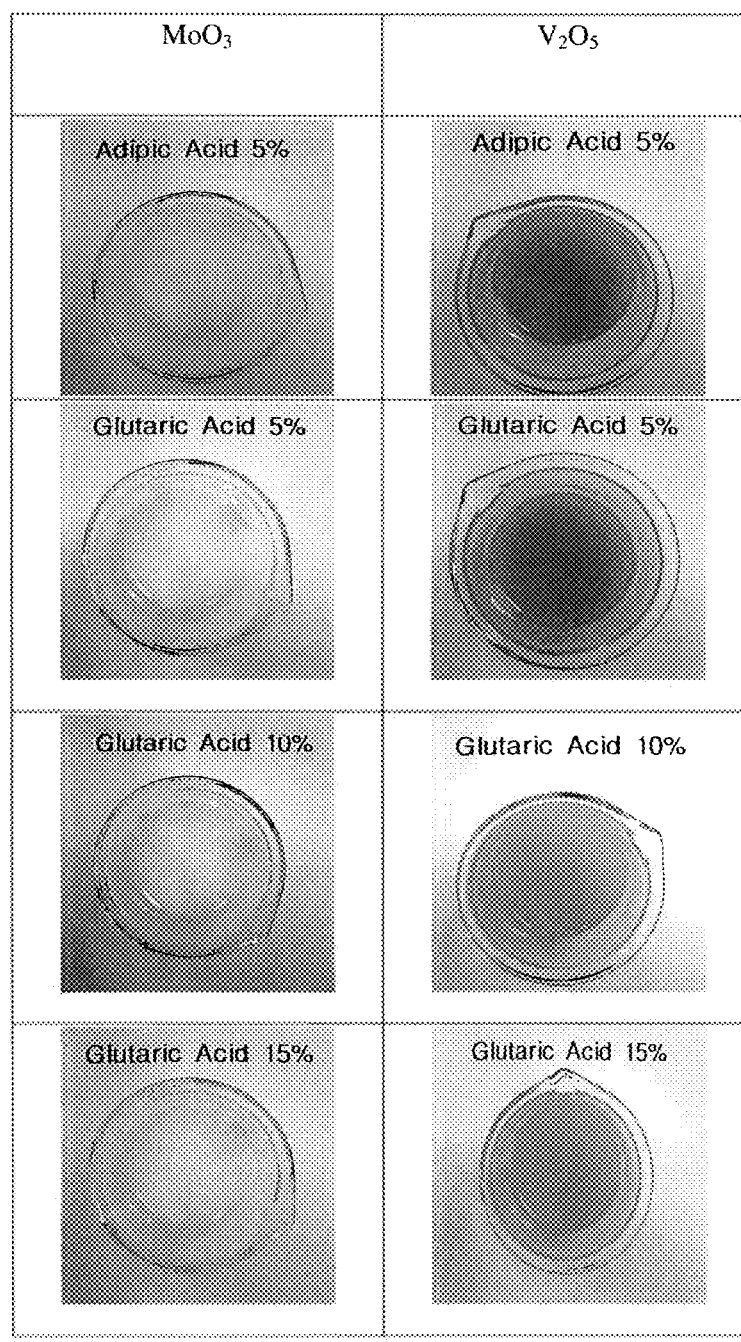
FIGS. 2 to 4 show effects of leaching with $MoO_3$ and $V_2O_5$ when malonic acid, succinic acid, glutaric acid, adipic acid, pimelic acid, suberic acid, and azelaic acid are used.
Figure 3:
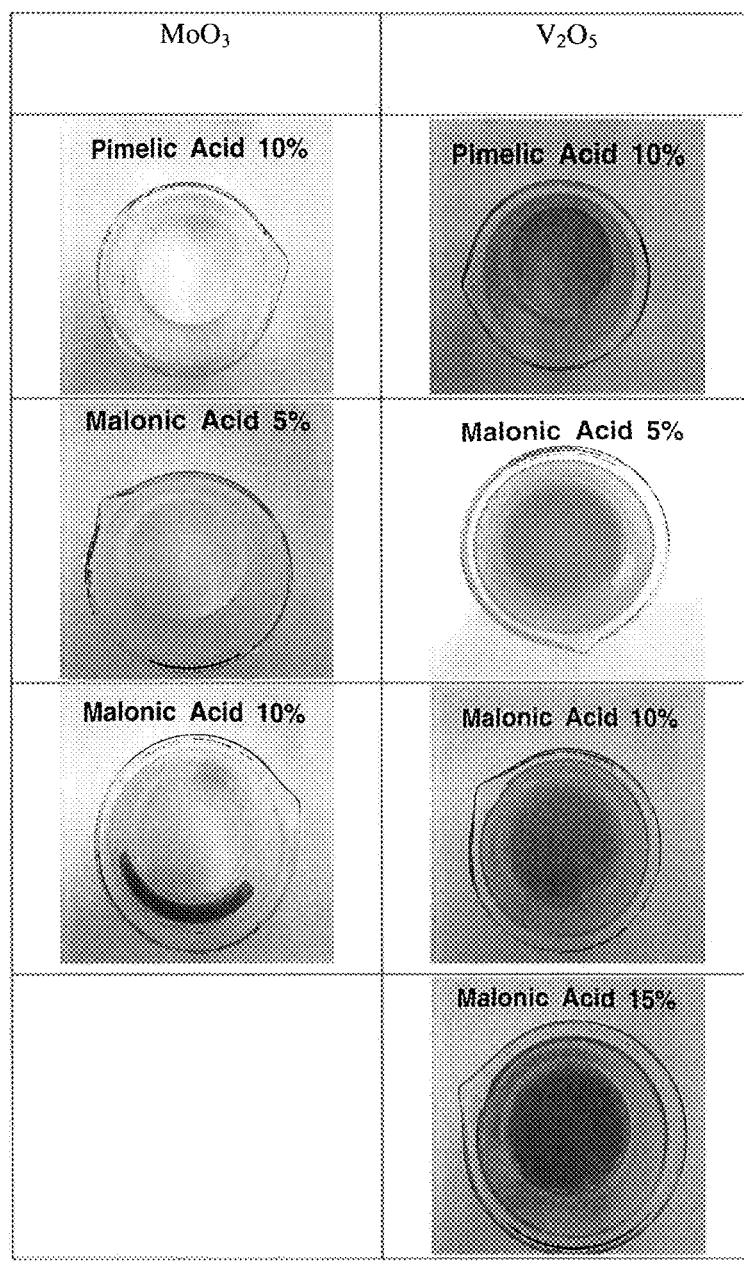
Figure 4:
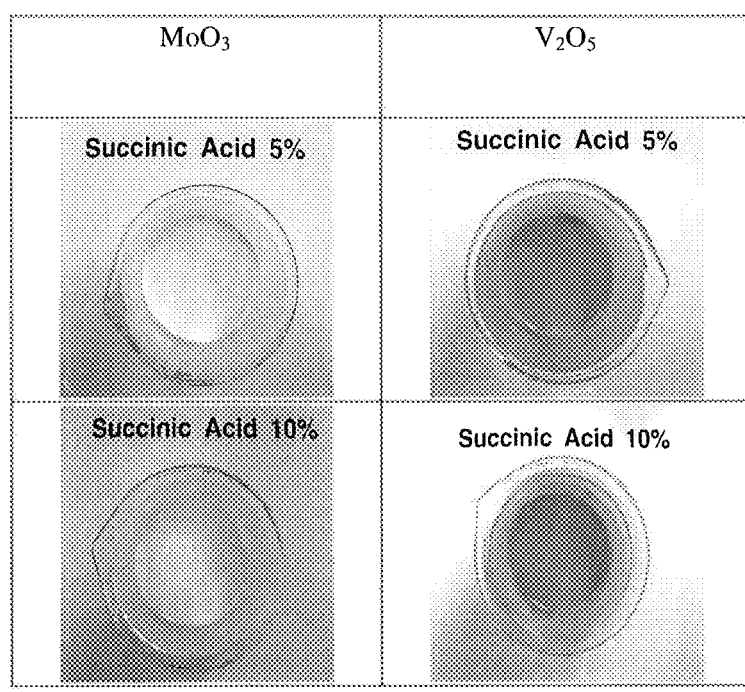

Effects of leaching with $MoO_3$ and $V_2O_5$ were examined under the same conditions, except that malonic acid, succinic acid, glutaric acid, adipic acid, pimelic acid, suberic acid, and azelaic acid were used instead of the oxalic acid used in Example 1. As shown in Table 2, in case of adipic acid, glutaric acid, malonic acid, pimelic acid, and succinic acid, a white powder was precipitated on the bottom of the beaker, and the solution looked turbid because the $MoO_3$ was not dissolved. $V_2O_5$ was not dissolved either, and thus the solution was turbid and turned yellow. The results are shown by the images in FIGS. 2 to 4. Meanwhile, suberic acid and azelaic acid were not dissolved even in distilled water, and thus were excluded from the experiments of dissolving $MoO_3$ and $V_2O_5$.

TABLE 2

| | $MoO_3$, $V_2O_5$ leaching reaction with respect to other dicarboxylic acids | | | |
|---|---|---|---|---|
| Type of organic acid | Concentration (%) | Distilled water | $MoO_3$ | $V_2O_5$ |
| Adipic acid | 5 | ○ | X | X |
| | 10 | X | — | — |
| Glutaric acid | 5 | ○ | X | X |
| | 10 | ○ | X | X |
| | 15 | ○ | X | X |
| Pimelic acid | 10 | ○ | X | X |
| Malonic acid | 5 | ○ | X | X |
| | 10 | ○ | X | X |
| | 15 | ○ | — | X |

TABLE 2-continued

MoO₃, V₂O₅ leaching reaction with respect to other dicarboxylic acids

| Type of organic acid | Concentration (%) | Distilled water | MoO₃ | V₂O₅ |
|---|---|---|---|---|
| Succinic acid | 5 | ○ | X | X |
|  | 10 | ○ | X | X |
| Suberic acid | 5, 10, 15 | X | — | — |
| Azelaic acid | 5, 10, 15 | X | — | — |

EXAMPLE 2

Regeneration and Remanufacture of CoMo/γ-Al₂O₃

A spent catalyst sufficiently covered with heavy oil was cleaned with a sufficient amount of organic solvent (n-heptane or n-hexane), followed by drying the spent catalyst in a drying furnace at 100 to 120° C. through natural drying.

Afterward, sintering was performed for 1 to 3 hours by adding a catalyst to a reaction sintering pipe containing 40% of vapor and maintained at 550° C. Here, an aspirator was installed at an outlet region of the sintering pipe to exhaust air aspirated from the sintering pipe, so that sintering in which an activation point of the catalyst was agglomerated did not occur, the carbon contained in the catalyst met the oxygen in the air, thereby completely removing carbon precipitated in the catalyst. Here, the black spent catalyst looked yellowish or yellow showing that the precipitated carbon was completely removed and a catalyst activity-degrading component, vanadium, was precipitated on a surface of the catalyst. In addition, in this process, sulfur was removed in the form of $SO_2$ by cracking aluminum sulfate formed on a surface of γ-Al₂O₃ (in this case, the concentration of vapor could be changed to 0 to 70% depending on the state of the catalyst, and a sintering temperature could be changed to 450 to 550° C. and increased to 550° C. from room temperature at a rate of 5 to 10° C. per minute).

Afterward, vanadium, which is usually precipitated in the catalyst, was removed using oxalic acid, and when the catalyst in a high temperature dried state after the thermal treatment was completed was in direct contact with an organic acid solution, the catalyst could be damaged due to high adsorption heat, and thus it was immersed in distilled water to wet a catalyst surface after being gradually cooled and then treated with an acid. The acid treatment was performed with oxalic acid in a concentration of 15%, at a temperature of the oxalic acid solution of 50° C. through treatment of ultrasonic waves having an intensity of 40 kHz for 6 minutes (in this case, depending on the state of the catalyst, the concentration of the oxalic acid could be changed to 2 to 60%, the temperature of the oxalic acid solution could be changed to 20 to 60° C., a frequency of ultrasonic waves could be changed to 40 to 60 kHz, and a time for the ultrasonic treatment could be changed to 5 to 30 minutes). Afterward, the oxalic acid attached to the catalyst was completely cleaned with distilled water and dried, thereby completing regeneration of the spent catalyst.

Subsequently, as needed, traces of cobalt nitrate and hepta molybdate (Co, based on CoO, was 0.3%, and Mo, based on $MO_3$, was 1% of the total mass of the catalyst) were impregnated through incipient wetness impregnation, and dry sintered at 120° C. for 4 hours or more and at 550° C. for 2 hours to compensate for the lost Co and Mo, thereby completing remanufacture of the catalyst.

Physical properties of the regeneration and remanufactured catalysts were compared with those of the spent catalyst and the fresh catalyst, and the results are shown in Table 3.

TABLE 3

| Component analysis | Component | Spent catalyst | Regenerated catalyst | Remanufactured catalyst | Fresh catalyst |
|---|---|---|---|---|---|
| XRF (wt %) | Al₂O₃ | 34.82 | 38.15 | 38.82 | 38.04 |
|  | P₂O₅ | — | — | — | 0.93 |
|  | SO₃ | 1.24 | 0 | 0 | — |
|  | CaO | 0.62 | 0.56 | 0.62 | 0.61 |
|  | TiO₂ | 0.62 | 0.11 | 0.62 | 0.62 |
|  | V₂O₅ | 4.68 | 0.27 | 0.28 | — |
|  | Cr₂O₃ | 0.02 | 0 | 0.02 | — |
|  | Fe₂O₃ | 0.98 | 0.18 | 0.98 | — |
|  | Co₂O₃ | 5.37 | 5.34 | 6.37 | 5.89 |
|  | Ni₂O₃ | 4.99 | 4.84 | 4.99 | 4.85 |
|  | MoO₃ | 46.56 | 50.35 | 47.2 | 48.27 |
|  | WO₃ | 0.11 | 0.19 | 0.11 | 0 |
| ICP elemental analysis (ppm) | Co | 50.79 | 43.31 | 44.21 | 50.82 |
|  | Ni | 55 | 55.72 | 54.84 | 55.73 |
|  | Mo | 15990 | 15742 | 16126 | 15822 |
|  | Fe | 61.25 | 60.14 | 58.32 | 20.14 |
|  | S | 956.9 | 59.15 | 51.87 | nd |
|  | V | 203.8 | 17.25 | 16.14 | nd |
| Analysis items | Unit | Spent catalyst | Regenerated catalyst | Remanufactured catalyst | Fresh catalyst |
| BET specific surface area | m²/g | 68.1916 | 262.5061 | 260.1764 | 276.1438 |
| Compressive strength | MPa | 17.1745 | 16.2487 | 15.8412 | 17.1452 |

Desulfurization performances of the regenerated and remanufactured catalysts, the spent catalyst and the fresh catalyst were compared with each other as follows.

A reaction apparatus used in the experiment was a fixed-layer high pressure continuous-flow reactor, which is CATATEST UNIT. The reaction apparatus could be regulated to have a maximum temperature of 550° C., a maximum pressure of 150×10 Pa, and a liquid flow rate of 10 to 750 ml/hr, a liquid reactant was quantitatively injected into the reactor by a reciprocating micrometering pump, and hydrogen was injected into the reactor by a reducing pressure regulator to which a 50 m capillary tube was attached. The flow rate of hydrogen was measured by a mass flow controller (MFC) attached to the front of the reactor, and recorded by a recorder. A gas passing through the reactor was regulated by a back pressure regulator, and the liquid and the gas were passed through a condenser, separated by a high pressure separator and a low pressure separator, and collected as a sample.

An amount of the outflowing gas was measured by a wet gas meter, and an amount of the liquid was calculated by measuring a liquid level by a high pressure separator and a flow rate of the liquid flowing through a solenoid valve for a certain time.

The temperature of the reactor was isothermally controlled in four levels by a controller, and a control range was within 1 K. An upper part of the reactor served as a preheater, and a liquid reactant was vaporized in the preheater and injected into a catalyst layer.

The controller controlled a temperature of the reactor, a liquid level of the high pressure separator, and a liquid level of the reactant. A temperature of each layer of the reactor, a hydrogen flow rate, a liquid level of the high pressure separator, and a liquid level of a low pressure separator were recorded by the recorder.

Reaction variables including a temperature, a pressure, a $H_2$/H.C. molar ratio, and a contact time were determined, and a range of the reaction condition was determined through a preliminary experiment.

The reaction conditions and standard conditions are shown in Table 4. In addition, all prepared catalytic reaction tests were performed after pre-treatment performed by sulfurizing a mixed gas (95% $H_2$ and 5% $H_2S$) in-situ in the reactor at 773K. In addition, qualitative analysis of the reactants and products was performed using G.C. mass (6890A, Hewlett Packard Co.), and quantitative analysis was performed using G.C. mass (6890A, Hewlett Packard Co.) by a flame ionization detector (F.I.D.). The used column was an ultraperformance capillary column (50×0.32 ID, fused silica, 0.52 mm crosslinked methylsilicon 19091A-115).

TABLE 4

| Reaction variation | Operation ranges | Standard condition |
| --- | --- | --- |
| 1. Catalysts | | |
| Loading weight | 0.5 g | 0.5 g |
| Particle size | 50/80, 80/100, 100/120 mesh | 80/100 mesh |
| 2. Reaction | | |
| Temperature | 623 to 773 K | 673 K |
| Pressure | 10 × 15 to 50 × 10 Pa | 30 × 10 Pa |
| Contact time (W/F) | 0.01 to 0.04 gcat · hr/ml feed | 0.02 gcat · hr/ml feed |
| $H_2$/H.C. mole ratio | 10 to 100 | 40 |
| DBT mol % | 0.5 mol % | 0.5 mol % |

A degree of the reaction was expressed as a conversion rate (X), a reaction rate (γ), and selectivity (S). In addition, to fill the reactor with the catalyst, a location of the catalyst layer in the reactor should be determined. The catalyst layer should be the safest in a temperature change, and the location of the catalyst layer should be determined based on the location and volume of the catalyst layer facilitating diffusion of a reactant. In this experiment, the catalyst layer was placed in the center of the reactor having the narrowest temperature control range. The catalyst and the inert material were diluted with carborundum (SiC) in a ratio of 1:5, a volume of the catalyst layer was determined as 15 cm³, and the catalyst was filled within a range in which diffusion resistant and bypassing effects of the reactant were inhibited. The filling of the catalyst was performed by filling an inlet and an outlet of the reactor with quartz wool and 80 mesh of carborundum thereon to prevent leakage of the catalyst and the inert filler. The catalyst filling was completed by forming a catalyst by putting a ring for fixing a catalyst layer thereon, adding again a quartz fiber, and quantifying the catalyst and carborundum to fill, putting the ring on the quartz fiber, putting carborundum thereon, and fixing the resulting product with a glass fiber. In addition, a liquid reactant, n-decane, was transferred to a feed tank by a supply pump from a supply tank, and provided to the reactor at a desired flow rate by regulating a metering pump. Here, the flow rate was confirmed by a 1 ml metering glass tube. A regulated amount of hydrogen of the gas reactant from a storage container ($10^2 \times 10$ Pa) was qualitatively added due to a pressure difference caused by a capillary tube, following which a desired pressure was measured by an indicator and regulated by a vacuum regulator. The hydrogen added into the reactor was measured by a glass mass flow meter, and recorded by a recorder. The gas mass flow meter was calibrated before the experiment. In this experiment, 2 hours after the supply of the reactant and the change of the reaction condition, a sample of a reaction product was taken and analyzed.

Since all of the reaction catalysts had high initial activities, analysis was performed after the catalyst was stabilized by performing the experiment under a standard condition. The results of hydrodesulfurization of DBT under the standard condition were shown in Table 5.

TABLE 5

| | Items | | | |
| --- | --- | --- | --- | --- |
| | Spent catalyst | Regenerated catalyst | Remanufactured catalyst | Fresh catalyst |
| DBT conversion rate (conversion %) | 41.2 | 82.2 | 84.9 | 85.2 |

EXAMPLE 3

Regeneration and Remanufacture of NiMo/γ-$Al_2O_3$

A spent catalyst sufficiently covered with heavy oil was cleaned with a sufficient amount of organic solvent (n-heptane or n-hexane), followed by drying the spent catalyst in a drying furnace at 100 to 120° C. through natural drying.

Afterward, sintering was performed for 1 to 3 hours by adding a catalyst to a reaction sintering pipe containing 40% of vapor and maintained at 550° C. Here, an aspirator was installed at an outlet region of the sintering pipe to exhaust air aspirated from the sintering pipe, so that sintering in which an activation point of the catalyst was agglomerated did not occur, and the carbon contained in the catalyst met the oxygen in the air, thereby completely removing carbon precipitated in the catalyst. Here, the black spent catalyst looked yellowish or yellow showing that the precipitated carbon was completely removed and a catalyst activity-degrading component, vanadium, was precipitated on a surface of the catalyst. In addition, in this process, sulfur is removed in the form of $SO_2$ by cracking aluminum sulfate formed on a surface of γ-$Al_2O_3$ (in this case, the concentration of vapor could be changed to 0 to 70% depending on the state of the catalyst, and a sintering temperature could be changed to 450 to 550° C. and increased to 550° C. from room temperature at a rate of 5 to 10° C. per minute).

Afterward, vanadium, which is usually precipitated in the catalyst, was removed using oxalic acid, and when the catalyst in a high temperature dried state after the thermal treatment was completed was in direct contact with an organic acid solution, the catalyst could be damaged due to high adsorption heat, and thus it was immersed in distilled water to wet a catalyst surface after being gradually cooled and then treated with an acid. The acid treatment was performed with oxalic acid in a concentration of 15%, at a temperature of the oxalic acid solution of 50° C. through treatment of ultrasonic waves having an intensity of 40 kHz for 6 minutes (in this case, depending on the state of the catalyst, the concentration of the oxalic acid could be changed to 2 to 60%, the temperature of the oxalic acid solution could be changed to 20 to 60° C., a frequency of ultrasonic waves could be changed to 40 to 60 kHz, and a time for the ultrasonic treatment could be changed to 5 to 30 minutes). Afterward, the oxalic acid attached to the catalyst was completely cleaned with distilled water and dried, thereby completing regeneration of the spent catalyst.

Subsequently, as needed, traces of cobalt nitrate and hepta molybdate (Co, based on CoO, was 0.3%, and Mo, based on $MO_3$, was 1% of the total mass of the catalyst) were impregnated through incipient wetness impregnation, and dry sintered at 120° C. for 4 hours or more and at 550° C. for 2 hours to compensate the lost Co and Mo, thereby completing remanufacture of the catalyst.

Physical properties of the regeneration and remanufactured catalysts were compared with those of the spent catalyst and the fresh catalyst, and the results are shown in Table 6.

the reactor by a reciprocating micrometering pump, and hydrogen was injected into the reactor by a reducing pressure regulator to which a 50 m capillary tube was attached. The flow rate of hydrogen was measured by a mass flow controller (MFC) attached to the front of the reactor, and recorded by a recorder. A gas passing through the reactor was regulated by a back pressure regulator, and the liquid and the gas passed through a condenser, separated by a high pressure separator and a low pressure separator, and collected as a sample.

An amount of the outflowing gas was measured by a wet gas meter, and an amount of the liquid was calculated by measuring a liquid level by a high pressure separator and a flow rate of the liquid flowing through a solenoid valve for a certain time.

The temperature of the reactor was isothermally controlled in four levels by a controller, and a control range was within 1 K. An upper part of the reactor served as a preheater, and a liquid reactant was vaporized in the preheater and injected into a catalyst layer.

The controller controlled a temperature of the reactor, a liquid level of the high pressure separator, and a liquid level of the reactant. A temperature of each layer of the reactor, a hydrogen flow rate, a liquid level of the high pressure separator, and a liquid level of a low pressure separator were recorded by the recorder.

Reaction variables including a temperature, a pressure, a $H_2/H.C.$ molar ratio, and a contact time were determined, and a range of the reaction condition was determined through a preliminary experiment.

The reaction conditions and standard conditions are shown in Table 4. In addition, all prepared catalytic reaction tests were performed after pre-treatment performed by sul-

TABLE 6

| Component analysis | Component | Spent catalyst | Regenerated catalyst | Remanufactured catalyst | Fresh catalyst |
|---|---|---|---|---|---|
| XRF (wt %) | $Al_2O_3$ | 17.77 | 60.33 | 60.33 | 71.31 |
| | $P_2O_5$ | | 13.29 | 12.13 | 9.55 |
| | $SO_3$ | 31.28 | 0.74 | 0.74 | 0 |
| | CaO | 0.49 | 0.67 | 0.68 | 0.79 |
| | $V_2O_5$ | 31.84 | 0.21 | 0.2 | |
| | $Cr_2O_3$ | 0.14 | | | |
| | $Ni_2O_3$ | 10.55 | 11.5 | 11.8 | 14.7 |
| | $MoO_3$ | 7.93 | 13.26 | 14.12 | 16.88 |
| ICP elemental analysis (ppm) | Co | nd | nd | nd | nd |
| | Ni | 2564 | 2659 | 2812 | 2728 |
| | Mo | 20107 | 19927 | 20942 | 20176 |
| | Fe | nd | nd | nd | nd |
| | S | 15293 | 2007 | 1982 | 1350 |
| | V | 16681 | 24 | 28 | nd |
| Analysis items | Unit | Spent catalyst | Regenerated catalyst | Remanufactured catalyst | Fresh catalyst |
| BET specific surface area | $m^2/g$ | 45.6587 | 239.8749 | 235.1498 | 254.1315 |
| Compressive strength | Mpa | 21.0102 | 19.8412 | 17.5413 | 21.0184 |

Desulfurization performances of the regenerated and remanufactured catalysts, the spent catalyst, and the fresh catalyst were compared with each other as follows.

A reaction apparatus used in the experiment was a fixed-layer high pressure continuous-flow reactor, which is CATATEST UNIT. The reaction apparatus could be regulated to have a maximum temperature of 550° C., a maximum pressure of 150×10 Pa, and a liquid flow rate of 10 to 750 ml/hr, a liquid reactant was quantitatively injected into furizing a mixed gas (95% $H_2$ and 5% $H_2S$) in-situ in the reactor at 773K. In addition, qualitative analysis of the reactants and products was performed using G.C. mass (6890A, Hewlett Packard Co.), and quantitative analysis was performed using G.C. mass (6890A, Hewlett Packard Co.) by a flame ionization detector (F.I.D.). The used column was an ultraperformance capillary column (50×0.32 ID, fused silica, 0.52 mm crosslinked methylsilicon 19091A-115).

TABLE 7

| Reaction variation | Operation ranges | Standard condition |
|---|---|---|
| 1. Catalysts | | |
| Loading weight | 0.5 g | 0.5 g |
| Particle size | 50/80, 80/100, 100/120 mesh | 80/100 mesh |
| 2. Reaction | | |
| Temperature | 623 to 773 K | 673 K |
| Pressure | 10 × 15 to 50 × 10 Pa | 30 × 10 Pa |
| Contact time (W/F) | 0.01 to 0.04 gcat · hr/ml feed | 0.02 gcat · hr/ml feed |
| $H_2$/H.C. mole ratio | 10 to 100 | 40 |
| DBT mol % | 0.5 mol % | 0.5 mol % |

A degree of the reaction was expressed as a conversion rate (X), a reaction rate (γ), and selectivity (S). In addition, to fill the reactor with the catalyst, a location of the catalyst layer in the reactor should be determined. The catalyst layer should be the safest in a temperature change, and the location of the catalyst layer should be determined based on the location and volume of the catalyst layer facilitating diffusion of a reactant. In this experiment, the catalyst layer was placed in the center of the reactor having the narrowest temperature control range. The catalyst and the inert material were diluted with carborundum (SiC) in a ratio of 1:5, a volume of the catalyst layer was determined as 15 cm³, and the catalyst was filled within a range in which diffusion resistant and bypassing effects of the reactant were inhibited. The filling of the catalyst was performed by filling an inlet and an outlet of the reactor with quartz wool and 80 mesh of carborundum thereon to prevent leakage of the catalyst and the inert filler. The catalyst filling was completed by forming a catalyst by putting a ring for fixing a catalyst layer thereon, adding again a quartz fiber, and quantifying the catalyst and carborundum to fill, putting the ring on the quartz fiber, putting carborundum thereon, and fixing the resulting product with a glass fiber. In addition, a liquid reactant, n-decane, was transferred to a feed tank by a supply pump from a supply tank, and provided to the reactor at a desired flow rate by regulating a metering pump. Here, the flow rate was confirmed by a 1 ml metering glass tube. A regulated amount of hydrogen of the gas reactant from a storage container ($10^2$×10 Pa) was qualitatively added due to a pressure difference caused by a capillary tube, following which a desired pressure was measured by an indicator and regulated by a vacuum regulator. The hydrogen added into the reactor was measured by a glass mass flow meter, and recorded by a recorder. The gas mass flow meter was calibrated before the experiment. In this experiment, 2 hours after the supply of the reactant and the change of the reaction condition, a sample of a reaction product was taken and analyzed.

Since all of the reaction catalysts had high initial activities, analysis was performed after the catalyst was stabilized by performing the experiment under a standard condition. The results of hydrodesulfurization of DBT under the standard condition are shown in Table 8.

TABLE 8

| | Items | | | |
|---|---|---|---|---|
| | Spent catalyst | Regenerated catalyst | Remanufactured catalyst | Fresh catalyst |
| DBT conversion rate (conversion %) | 35.7 | 80.7 | 82.3 | 82.9 |

While the invention has been shown and described with reference to certain exemplary embodiments thereof, it will be understood by those skilled in the art that various modifications in form and details may be made therein without departing from the spirit and scope of the invention as defined by the appended claims.

The invention claimed is:

1. A regenerated or remanufactured catalyst for hydrogenating heavy oil or residual oil, comprising:
   an active component; and
   a catalyst supporter,
   wherein the catalyst has a content of a vanadium oxide measured by XRF of 0.3 wt % or less,
   wherein, in ICP elemental analysis, a value of vanadium elements in the catalyst is 30 ppm or less.

2. The catalyst according to claim 1, wherein the active component is at least one selected from the group consisting of molybdenum, tungsten, cobalt, nickel, and oxides thereof.

3. The catalyst according to claim 1, wherein the catalyst supporter is alumina; or is alumina having phosphorus, boron, silicon or an oxide thereof.

4. The catalyst according to claim 1, which has a content of sulfur trioxide measured by XRF of 1 wt % or less.

5. The catalyst according to claim 1, which has a BET specific surface area of 200 m²/g or more.

6. The catalyst according to claim 1, wherein a compressive strength of the catalyst is 95% or more of that of a fresh catalyst.

7. The catalyst according to claim 1, wherein the hydrogenation is hydrodesulfurization, hydrodenitrification or combination thereof.

* * * * *